Patented Nov. 27, 1934

1,981,897

UNITED STATES PATENT OFFICE 1,981,897

BODY FOR MOTOR VEHICLES

William Henry Bishop, Birmingham, England

Application July 9, 1932, Serial No. 621,589
In Great Britain October 16, 1931

8 Claims. (Cl. 296—95)

This invention relates to improvements in bodies for motor vehicles and refers particularly to bodies of the saloon type having a rigid head or roof with or without a sliding panel for an opening in the head.

It has hitherto been common practice for the head to be extended forwardly for a short distance beyond the upper edge of the windscreen to act as a canopy, and this canopy also serves to a certain extent as a visor to protect the eyes of the driver when driving in strong light or against the sun.

The presence of the canopy, however, considerably increases the wind-resistance of the vehicle when traveling fast as it traps the flow of air passing upwardly over the windscreen and sets up eddies, so that with a vehicle capable of high speeds it is desirable to omit the canopy and to merge the front end of the roof into the plane of the windscreen in a smooth curve without projections, but in that case there is no protection for the eyes of the driver against strong light or sun and if a forwardly extending sun visor of the ordinary type is fitted the benefits of the omission of the canopy are lost.

One object of my invention is to provide means whereby the advantages of a canopy or sun visor can be obtained when desired without increasing the normal wind resistance and which can be readily fitted to existing vehicles or incorporated in vehicles in the course of construction.

Another object is to provide a ventilator which is applicable to the front, sides or rear of a vehicle roof and can be opened to admit light or air but which when closed conforms with the normal smooth contour of the roof so that it does not detract from the appearance of the roof or increase the wind-resistance.

Another object is to provide a ventilator which can readily be applied to the front of the roof of a saloon car or of a closed driver's cab having the front end of the roof merged into the plane of the roof in a smooth curve and which can be employed to admit light or air above the driver's head without giving rise to undesirable draughts and without admitting rain.

My invention consists in providing for an opening in a curved edge of a vehicle roof a shell or cover which conforms when closed with the normal contour of the edge of the roof and is capable of being displaced bodily or swung about one edge to uncover the opening. When the shell or cover is applied to the front edge of a vehicle roof it is conveniently mounted in such a way that either its rear edge can be swung upwardly or the whole shell or cover can be swung or slid forwardly into a position in which it projects over the windscreen. In the first position the shell or cover lies in an upwardly and rearwardly inclined position in which it will deflect upwardly air passing over it and will set up a powerful extractor effect which draws air from the interior of the vehicle through the opening. The shell or cover can be used in this position even in heavy rain as the air current will carry the rain drops over the opening, and one is thus able to obtain adequate ventilation when driving under conditions which would make it impossible to open a sliding roof. If desired, the rear edge of the cover when closed may extend for a substantial distance behind the rear edge of the opening or over the front edge of a sliding roof panel if one is fitted. When the cover is used in conjunction with a sliding roof panel it substantially increases the length of the maximum effective opening, and the upward deflection of the air by the cover prevents any risk of downdraughts entering the vehicle through the rear part of the roof opening when the panel is in its rearmost position.

When the cover is in its second or forwardly projected position it acts as a very effective canopy and sun visor. In this position its rear edge may fit closely against the fixed front crossmember of the roof or may be spaced from it so that air passing up over the windscreen may flow between the cover and the roof and a minimum amount of wind resistance is offered.

In its closed position the cover does not detract in any way from the normal smooth contour of the windscreen and roof so that it does not set up eddies or increase the wind resistance.

When the movable cover is applied to the sides or rear of a vehicle roof it will usually be arranged so that its lower edge is carried on fixed pivots about which the cover can swing and this construction may also be employed for the front where a sun visor is not required. If it is desired to admit light without air a transparent panel, either fixed or movable, may be provided for the opening below the cover.

The front edge of the movable cover may extend downwardly over the upper edge of the windscreen frame and the sides of the cover may extend downwardly over the curved corners at the front end of the roof in which case the cover is conveniently pivoted on the windscreen pillar by means of integral arms extending downwardly from the cover. Alternatively the cover may be made of the same width as the